(12) United States Patent
Borg et al.

(10) Patent No.: US 7,784,031 B1
(45) Date of Patent: Aug. 24, 2010

(54) METHODS AND APPARATUS FOR ESTABLISHING CONFIGURATION SETTINGS BETWEEN APPLICATIONS

(75) Inventors: Lars U. Borg, Saratoga, CA (US); Manish S. Kulkarni, San Jose, CA (US); Ken K. Kameda, Menlo Park, CA (US); Lynn M. Cherny, Framingham, MA (US)

(73) Assignee: Adobe Systems, Inc., San Jose, CA (US)

( * ) Notice: Subject to any disclaimer, the term of this patent is extended or adjusted under 35 U.S.C. 154(b) by 1521 days.

(21) Appl. No.: 11/097,440

(22) Filed: Apr. 1, 2005

(51) Int. Cl.
 *G06F 9/44* (2006.01)
 *G06F 9/00* (2006.01)
 *G06F 9/24* (2006.01)
(52) U.S. Cl. .......................... 717/121; 713/1; 713/100
(58) Field of Classification Search ........................ None
 See application file for complete search history.

(56) References Cited

U.S. PATENT DOCUMENTS

2004/0120747 A1* 6/2004 Okochi ......................... 400/76
2007/0234223 A1* 10/2007 Leavitt et al. ............... 715/762

OTHER PUBLICATIONS

"Color Consistency and Adobe Creative Suite", Dec. 2003, pp. 1-25. Online retrieved at <www.adobe.com/products/creativesuite/pdfs/cscolormgmt.pdf>.*

"Adobe Creative Suite—New Feature Highlights", Dec. 2003, pp. 1-16. Online retrieved at <www.adobe.com/aboutadobe/pressroom/pressmaterials/creativesuite/pdfs/cs/nfh.pdf>.*

"Using Adobe Bridge and Adobe Version Cue CS2 to Streamline Your Workflow", Adobe, Nov. 2005, 21 pages, <http://www.adobe.com/products/creativesuite/pdfs/bri_vc_workflow.pdf>.*

"Adobe Bridge CS3—Adobe Version Cue CS3 User Guide", Adobe, 2007, 97 pages, <http://livedocs.adobe.com/en_US/Bridge/2.0/bridge_versioncue_cs3_help.pdf>.*

* cited by examiner

*Primary Examiner*—Tuan Q Dam
*Assistant Examiner*—Thuy Dao
(74) *Attorney, Agent, or Firm*—Chapin IP Law, LLC (57) ABSTRACT

A system provides for synchronization of configuration settings in a plurality of applications by receiving a global configuration setting to be applied to the plurality of applications and by applying the global configuration setting to the plurality of applications so that operation of each of the plurality of applications conforms to the global configuration setting. The system detects a respective local configuration setting in use by each of the plurality of applications displays a synchronization indicator that indicates if the plurality of applications are operating using a common local configuration setting. The synchronization indicator can be a color settings synchronization indicator that indicates if a color setting used to render color on a display device is synchronized between applications in a graphics suite.

31 Claims, 8 Drawing Sheets

190
(UNSYNCHRONIZED)

FIG. 5A 190
(UNSYNCHRONIZED)

205
DISPLAY A SYNCHRONIZATION INDICATOR THAT INDICATES IF THE PLURALITY OF APPLICATIONS ARE OPERATING USING A COMMON LOCAL CONFIGURATION SETTING

210
DETERMINE IF THE RESPECTIVE LOCAL CONFIGURATION SETTINGS IN USE BY EACH OF THE PLURALITY OF APPLICATIONS ARE EQUIVALENT TO THE GLOBAL CONFIGURATION SETTING, AND IF SO, DISPLAY THE COLOR SYNCHRONIZATION INDICATOR TO INDICATE THAT EACH OF THE PLURALITY OF APPLICATIONS IS OPERATING IN ACCORDANCE WITH THE GLOBAL CONFIGURATION SETTING

AND/OR

211
DETECT THAT AT LEAST ONE APPLICATION OF THE PLURALITY OF APPLICATIONS IS CONFIGURED WITH A LOCAL CONFIGURATION SETTING THAT IS DIFFERENT FROM A LOCAL CONFIGURATION SETTING OF A MAJORITY OF OTHER APPLICATIONS IN THE PLURALITY OF APPLICATIONS AND IN RESPONSE, DISPLAY THE COLOR SYNCHRONIZATION INDICATOR TO INDICATE THAT AT LEAST ONE APPLICATION OF THE PLURALITY OF APPLICATIONS IS CONFIGURED WITH A LOCAL CONFIGURATION SETTING THAT IS DIFFERENT FROM LOCAL CONFIGURATION SETTINGS OF A MAJORITY OF OTHER APPLICATIONS IN THE PLURALITY OF APPLICATIONS

AND/OR

212
DISPLAY A SYNCHRONIZATION INDICATOR THAT IS DIVIDED INTO SEGMENTS, EACH SEGMENT REPRESENTING A RESPECTIVE APPLICATION IN THE PLURALITY OF APPLICATIONS

213
FOR EACH OF THE PLURALITY OF APPLICATIONS THAT IS CONFIGURED WITH A DIFFERENT LOCAL CONFIGURATION SETTING, DISPLAY A SEGMENT IN THE SYNCHRONIZATION INDICATOR RESPECTIVELY ASSOCIATED WITH THAT APPLICATION IN A MANNER THAT INDICATES THAT THE APPLICATION IS CONFIGURED WITH A DIFFERENT LOCAL CONFIGURATION SETTING

METHODS AND APPARATUS FOR ESTABLISHING CONFIGURATION SETTINGS BETWEEN APPLICATIONS

BACKGROUND

Modern computer software applications often include a variety of configuration settings that a user may manipulate to control execution or operation of that application or associated devices within a computer system. As an example, software applications used to create content such as web page creation applications, photo editing applications or document production applications can have a variety of configuration settings that determine characteristic operation of the applications based on user-defined values of those configuration settings. As a specific example, a photo editing application may provide a user adjustable configuration setting to indicate to the photo editing application how colors are to be rendered within photos or digital images output to a display or other device by that application. Various color rendering algorithms exist and the photo editing application may allow the user to select from a variety of these different color rendering mechanisms for use when rendering colors by that application. Other examples of configuration settings a user may select or adjust include transparency settings, output data format settings, peripheral device settings, processing algorithm settings such as compression settings, and many other types of user adjustable application parameters. By allowing the user to adjust such configuration settings, the user is able to precisely determine how that application performs.

Many times, conventional software applications interrelate to one another to form a group of software applications often referred to as a suite of applications or groupware. Users can often use the applications in such a group or suite collectively to perform a large task such as production of a large content project. As an example, many software vendors produce groupware or bundled software applications that can exchange data with each other in a user-friendly manner. Such applications are often collaborative in nature and allow many users to collectively work together using the applications to produce highly detailed and complex graphical productions in presentations containing combinations of digital images, graphics and text. Examples of conventional applications that are often bundled together in this manner include a digital photo editor application, a web page development application, an illustrator application allowing creation of graphics, a word processor, and a document assembly program that produces a portable document format containing content created by the group of applications in the suite.

SUMMARY

There are a variety of deficiencies associated with conventional mechanisms and techniques for providing management and control of configuration settings associated with software applications. In particular, in situations where multiple software applications exist that are related in some manner, such as in a bundled set or suite of applications such as those mentioned above, there are often configuration settings that are common across each of the applications. As an example, for multiple applications used to develop content for a single production or project, selectable color configuration settings associated with each of the applications are often desired to be the same in order to ensure that each of the applications renders colors within the production in the same manner. However, conventional standalone software applications or those bundled in a software suite currently allow a user to adjust or manipulate configuration settings within that application using the interface provided by that application. As a result, it is up to the user to operate the configuration management interface for each individual application in order to ensure that each of the individual applications are configured with a common set of configuration settings so that the operation of each of the applications is the same.

Using the color settings example from above, when a user or group of users operates a suite of applications to produce a production, if the color settings of one or more of the applications are different from each other, colors rendered by an application with one color configuration setting look different than colors rendered by the other applications that are using a different color setting. Conventional configuration management techniques do not provide a centralized configuration setting management system to ensure that settings across a variety of related software applications are the same. Likewise, conventional configuration setting management techniques do not provide the ability to quickly graphically identify which applications in a group of related applications contain configuration settings that are different from other applications in a group. As a result, users must perform a highly manual effort of examining the configuration settings within each of the applications using the interface of each respective application in order to ensure the configuration settings are the same across all the applications. Further still, using conventional configuration setting techniques, once a user has confirmed the configuration settings of each application are set to the same values, there is nothing a user can use thereafter to confirm that the configurations remain the same. Thus the same or a different user might accidentally or intentionally modify configuration settings of one or more of the applications to a different value and this may remain undetected. This can have drastic effects during production runtime when time constraints are often a factor. Additionally, conventional configuration setting techniques do not provide the ability to centrally lock access configuration setting from other users in order to avoid mishaps such as the example above.

Embodiments of the invention significantly overcome the aforementioned deficiencies of conventional mechanisms and techniques for management and display of configuration settings across a variety of applications. In particular, embodiments of the invention provide a mechanism for centralized management and control of configuration settings shared by a plurality of applications. Specifically, a configuration manager is disclosed that synchronizes configuration settings in a plurality of applications. As will be explained in more detail, the configuration manager performs synchronization of configuration settings by receiving a global configuration setting to be applied to a plurality of applications and then applying the global configuration setting to the plurality of applications so that operation of each of the plurality of applications conforms to the global configuration setting. Additionally, the configuration manager as disclosed herein is able to detect a respective local configuration setting in use by each of the plurality of applications and can display a synchronization indicator that indicates if the plurality of applications are operating using a common local configuration setting. By being able to centrally manage and control configuration settings and by being able to detect configuration synchronization inconsistencies between applications, management of configuration settings across a plurality of applications is significantly streamlined.

In one configuration, receiving a global configuration setting to be applied to the plurality of applications comprises receiving a selection of a global color setting to be applied to the plurality of applications. The selected global color setting defines a color rendition process that can be used by the plurality of applications to render color on a display device. By display device, what is meant is any type of output device such as a computer monitor, or a printer or plotter or publishing system that produces hardcopy printed output. Detecting a respective local configuration setting in use by each of the plurality of applications is performed for each application of the plurality of applications by detecting a local color setting indicating a respective color rendition process used by that application to render color on a display device associated with that application. In this manner, color configuration settings can be centrally managed and controlled and a user is notified when an application has color settings that are not synchronized.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or within a software application. Example embodiments of the invention may be implemented within products and/or software applications manufactured by Adobe Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIGS. 6 through 8 are flow charts of processing steps that shows processing operations performed in accordance with example configurations.

DETAILED DESCRIPTION

Figure 1:
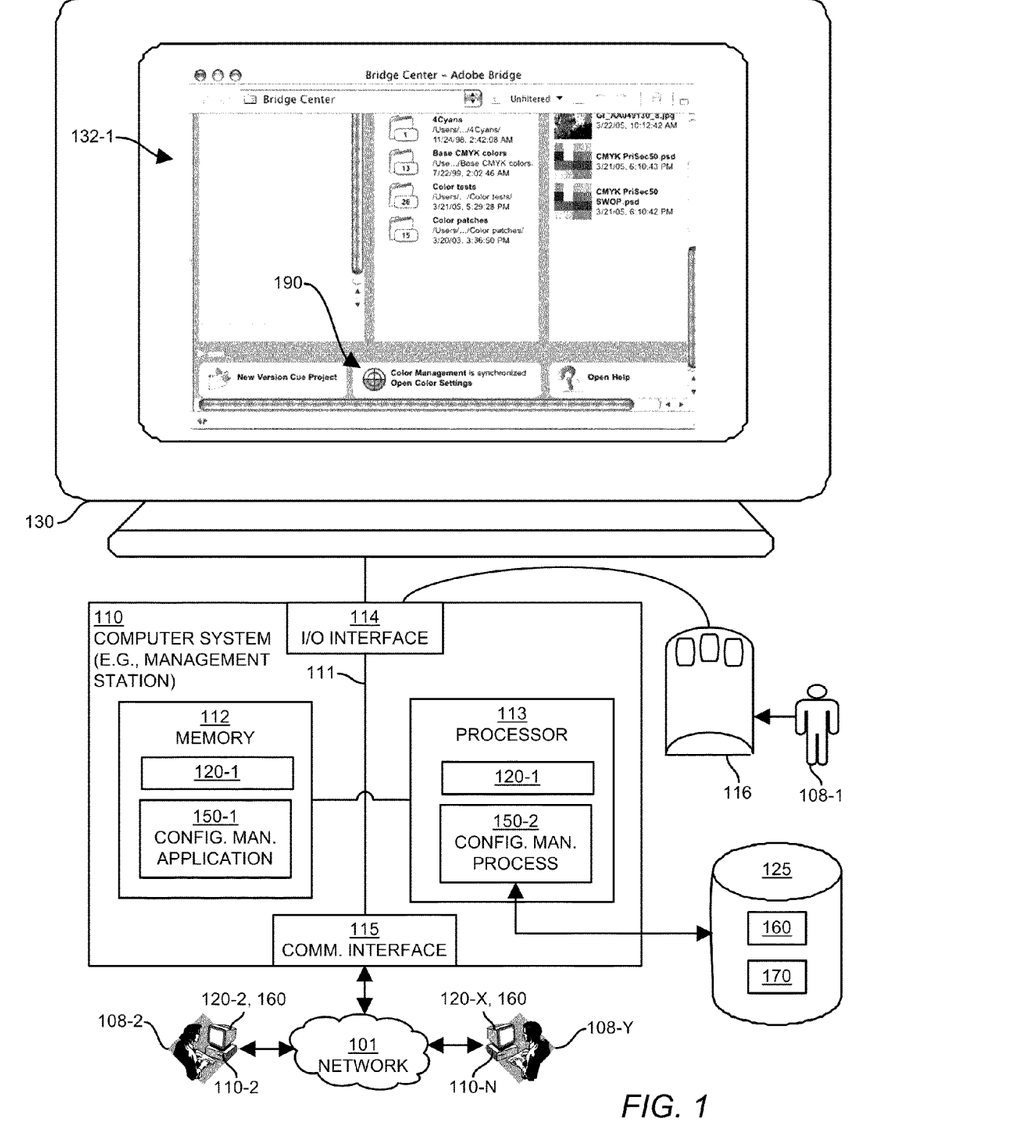
FIG. 1 is an example network environment including computer systems configured with applications and a configuration manager in accordance with one example embodiment.

FIG. 1 illustrates the computer-networking environment 100 suitable for use in explaining example embodiments of invention. The computer-networking environment 100 includes a network 101 such as a local area network (e.g., LAN) that interconnects a plurality of computer systems 110-1 through 110-N that each execute one or more software applications 120 under control of a plurality of users 108. The computer systems 110 may be any type of computerized device such as a personal computer, laptop, workstation, mainframe terminal, or the like. An example hardware architecture of the computer system 110-1 is shown in FIG. 1 by way of example only and it is to be understood that the details of the example computer systems 110-to through 110-N can be similar to those of compute system 110-1 but are not shown in FIG. 1 due to drawing space limitations. In this example, each computer system generally includes in interconnection mechanism 111 such as a data bus, motherboard or other circuitry that interconnects a memory 112, a processor 113, an input output interface 114 and a communications interface 115.

The memory 112 may be any type of computer readable medium such as random access memory (RAM), read only memory (ROM), or storage media that may be fixed or removable from the computer system 110 such as a floppy disk, magnetic disk, or optical disk media. The memory 112 is encoded with computer program logic (e.g., software code) 120-1 for each application 120 that, when executed on the processor 113, produces a process that carries out execution of that application 120. In this example, each computer system 110 also includes a display 130 such as a computer monitor and in input mechanism 116 such as a keyboard and/or mouse coupled to the input output interface 114. The application(s) 120, executing as processes within each computer system 110 under control of a respective user 108, can each render a graphical user interface 132 (132-1 rendered in the example in FIG. 1) on the display 130 for viewing by the user 108.

Additionally, each application 120 maintains respective local configuration settings 160, such as within a file stored within each computer system 110. The local configuration settings 160 file contains information that defines properties that indicate how each application 120 operates on that computer system. Embodiments of the invention provide a configuration manager 150 that implements mechanisms and techniques to allow synchronization of such local configuration settings 160 between the applications 120 based on global configuration settings 170, as will be explained. The local configuration settings file 160 can define configuration information such as a definition of a color rendition process that can be used by applications 120 to render color on the display 130 (or another output device), a definition of an output data format (e.g., file format) that can be used to store output data files, a definition of transparency settings used by the plurality of applications, a definition of a font strategy to be used by the plurality of applications, and so forth. The local configuration settings 160 can define parameters or other information for any combination of these types of configuration settings and for others not listed. It is to be understood that the list above is not exhaustive of the types of configuration information specific by the configuration settings.

As a specific example, the local configuration settings 160 for an application 120 on a specific computer 110 may define a local color setting to be used by that application 120 on that computer 110 to perform a color rendition process to output color images on a display device such as the display 130 (or to a printer, file, data format or the like). In the areas of color rendering there can be many different techniques to render color on an output device, and different techniques may produce slight variations in colors. In one configuration, a user 108 can set the color settings for a particular application 120 by modifying the color setting information within the local color configuration settings file 160 as will be explained. Such a local color settings file 160 can specify or define a specific color setting for use during operation of an application 120 on a computer 110, such as a monitor color setting of a computer display 130, a North America General Purpose color setting, a North America Prepress color setting, a North America Web/Internet color setting and the like. Depending upon the configuration, there can be a separate local configuration settings files 160 for each computer 110 (i.e., one file for all applications that operate on that computer), per application (i.e., a separate configuration settings file 160 for each application on each computer), or per user 108 (i.e., a separate configuration settings file for each user 108). Combinations of these are also possible, such as a separate local configuration settings file 160 for each application 120 for each user 108. In one configuration, the configuration manager 150 maintains a centralized configuration settings database 125 in relation to the plurality of applications on a per user, per application, or per computer basis, such that multiple instances of a single application being used by different users respectively maintain global 170 and local configuration settings 160 in the centralized configuration settings database 125 as shown in FIG. 1.

It is to be understood that the plurality of applications 120 can execute within different computer systems 110 as illustrated in the example in FIG. 1, or in an alternative configuration, the plurality of applications 120 can operate within a single computer system 110. It is also to be understood that not all computer systems require a display 130 capable of rendering the graphical user interface 132 as shown in computer system 110-1. As example, other computer systems 110 may operate software applications 120 that output content onto a different display device such as a printer or plotter, or to a data file or as packets transmitted over the network 100 for receipt by a remote computer system.

In one configuration, the plurality of software applications 120 that execute on the computer systems 110 are related to each other as a suite or group of software applications (e.g., groupware) that can operate using similar configuration settings 160 that are synchronized by the configuration manager 150 as will be explained. As an example, the plurality of applications 120 in the related suite of applications might collectively allow the users 108 to operate on content related to a common content creation and/or editing project. The applications 120 in such an example may include a web page development application, a digital graphics editing application (e.g., a photo editor or graphics development program), a document editing and creation application, a design application, or the like. Such a related suite of applications can each operate using the respective local configuration settings 160 maintained within each computer system 110.

Embodiments of the invention provide mechanisms and techniques to allow synchronization of such local configuration settings 160 between the applications 120 using the configuration manager 150, that in this example is an application itself that is associated with the related suite of applications 120. In particular, in one example configuration as illustrated in FIG. 1, the memory 112 in at least one computer system 110 (110-1 in this example) is configured with a configuration manager application 150-1 (e.g., computer program logic or software code) that when performed (e.g., executed, run, interpreted or otherwise operated) by the processor 113 produces a configuration manager process 150-2 that provides centralized control and management of common or global configuration settings 160 that can be used by each of the plurality of applications 120. The configuration manager application 150-1 and process 150-2 are collectively referred to herein as the configuration manager 150.

The configuration manager 150 produces the example graphical user interface 132-1 illustrated on the display 130 of the computer system 110-1 in FIG. 1 in accordance with one example embodiment. The graphical user interface 132-1 allows the user 108-1 to centrally manage configuration settings and access to files associated with the applications 120. In this example, the configuration manager 150 is an "Adobe Bridge Center" application that operates as a configuration manager for the plurality of applications 120 that are each related to the development and publishing of content (e.g., documents, web pages, etc.). The graphical user interface 132-1 in this example includes a synchronization indicator 190 that, in this example, is a circular graphical icon that indicates whether or not each of the plurality of applications 120 associated with the configuration manager 150 (i.e., all installed applications 120 that are part of the suite of applications for the creation and publishing of content in this example) have synchronized local configuration settings 160.

In this particular example, the synchronization indicator 190 indicates that all local color settings 160 associated with each of the applications 120 are indeed synchronized to a common global color setting 170. This specific indication is provided in this example by displaying the synchronization indicator 190 as being divided into segments 191-1 through 191-M. In this example, the segments are represented as a fully closed circle divided into quarters 191-1 through 191-4. Since the synchronization indicator 190 is a fully closed circle with all quarters 191 being joined in the middle (as opposed to having one or more quarters 191 of the circle removed or displayed disjointly or offset from the fully closed rendition, as will be shown later), the user 108 viewing the graphical user interface 132-1 is able to quickly visually identify that color management is synchronized (because of the fully closed circle of segments 191) between the installed applications 120 that are managed by (i.e., that are installed and known to, or visible to) the configuration manager 150.

In one configuration, each segment 191-1 through 191-M in the synchronization indicator 190 represents a respective application 120-1 through 120-X (i.e., X=M) of the plurality of applications 120. In such a configuration as will be shown shortly (e.g., in FIG. 4 or 5), if a specific application 120-X has a local configuration setting 160 that is out of synchronization with (i.e., is different from) local configuration settings 160 of other applications 120, or is out of synchronization with the global synchronization settings 170, the configuration manager 150 displays a segment 191-M in the synchronization indicator 190 that is respectively associated with that application 120-X (i.e., the application out of sync) in a manner that indicates to the user 108 which specific application 120-X is configured with a different local configuration setting 160.

Figure 4:
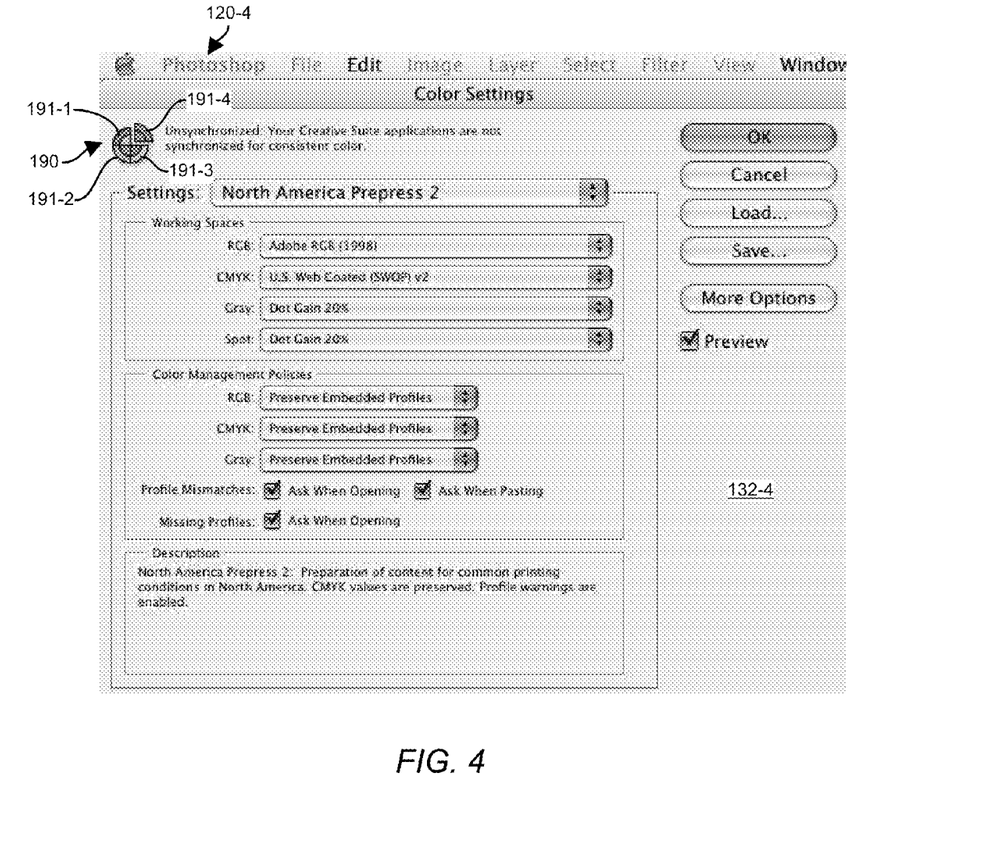
FIG. 4 illustrates a graphical user interface produced by an application having unsynchronized configuration settings in accordance with one example configuration.
Figure 5A:
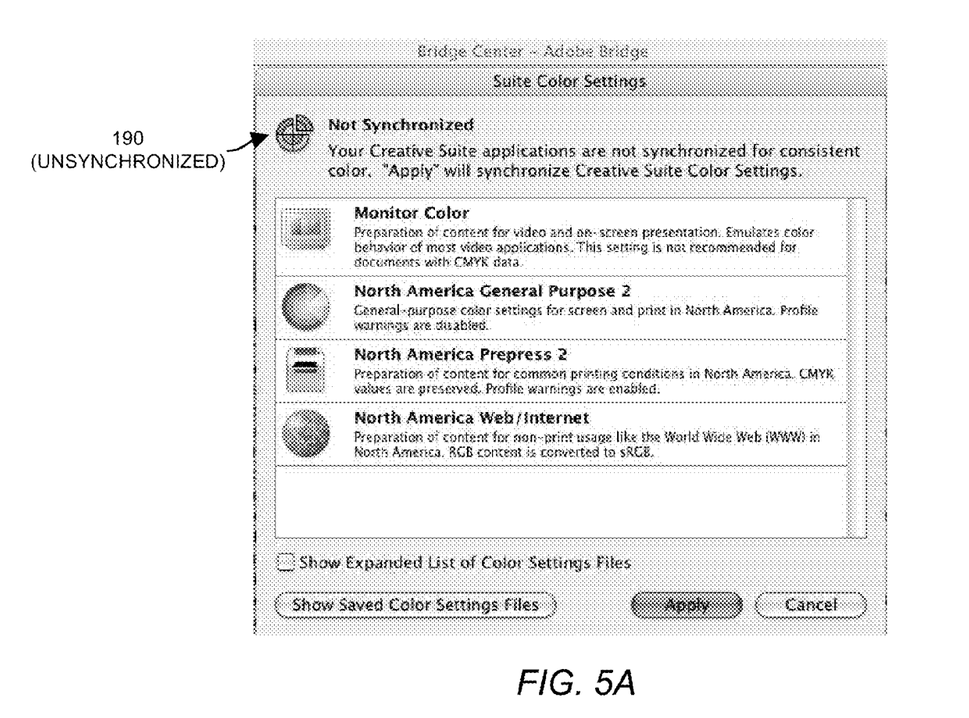
FIGS. 5A and 5B illustrate a graphical user interface produced by a configuration manager when applications have unsynchronized configuration settings in accordance with one example configuration.
Figure 5B:
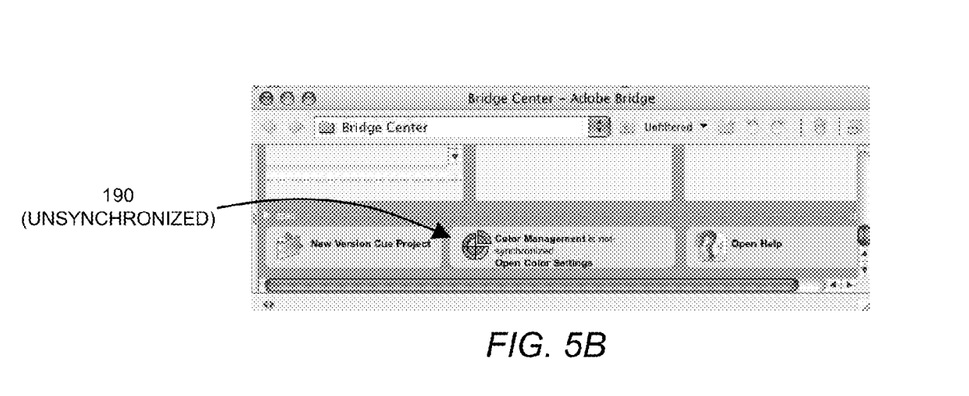

Directing attention briefly to the segmented synchronization indicator 190 shown in FIG. 4, the synchronization indicator 190 includes pie-shaped segments 191-1 through 191-4 that respectively represent the local configuration settings 160 for each application 120-1 through 120-4. In this example in FIG. 4, a user 108 of an application 120-4 called "Photoshop" has adjusted local color settings 160 (using color selection mechanisms 165) to make the local color settings 160 (i.e., either for that user 108, or for that installed version of Photoshop 120-4, or for that computer system 110, depending on the configuration) conform to something other than local color settings 160 used by other applications (e.g., 120-1 through 120-3), or alternatively, depending upon the configuration, the user 108 has selected local color settings 160 that do not conform to the global color settings 170 (i.e., either for that user 108, or for that installed version of Photoshop 120-4, or for that computer system 110, depending on the configuration). As a result, the segment 191-4 corresponding to the Photoshop application 120-4 is offset or disjoint (i.e., slightly removed from the center) of the circular synchronization indicator 190 as compared to the other segments 191-1, 191-2, and 191-3 that represent the other applications 120-1 through 120-3 (in the suite of applications 120 managed by the configuration manager 150) that have synchronized local configuration settings 160 (i.e., that are either the same as each other, or are the same as the global configuration settings file 170). This offset synchronization indicator segment 191-4 indicates that the Photoshop local configuration settings 160 are out of synchronization (either for that user 108, or for the installed Photoshop application on that computer 110, or for the entire network 100, depending upon the configuration). In this manner, the user 108 is able to quickly identify an application 120 that is not conforming to the global configuration settings 170 (or that is out of sync with other applications).

Returning now to the discussion of the graphical user interface 132-1 in FIG. 1, if the user 108 desires to perform configuration management of specific configuration settings 160 associated with the applications 120 (e.g., management of color settings in this example), the user 108 is able to operate an input mechanism 116 to select the synchronization indicator 190 (or select anywhere in the shaded region around the synchronization indicator 190 shown in FIG. 1). In response, the configuration manager 150 displays a graphical user interface 132-2 as shown in FIG. 2.

Figure 2:
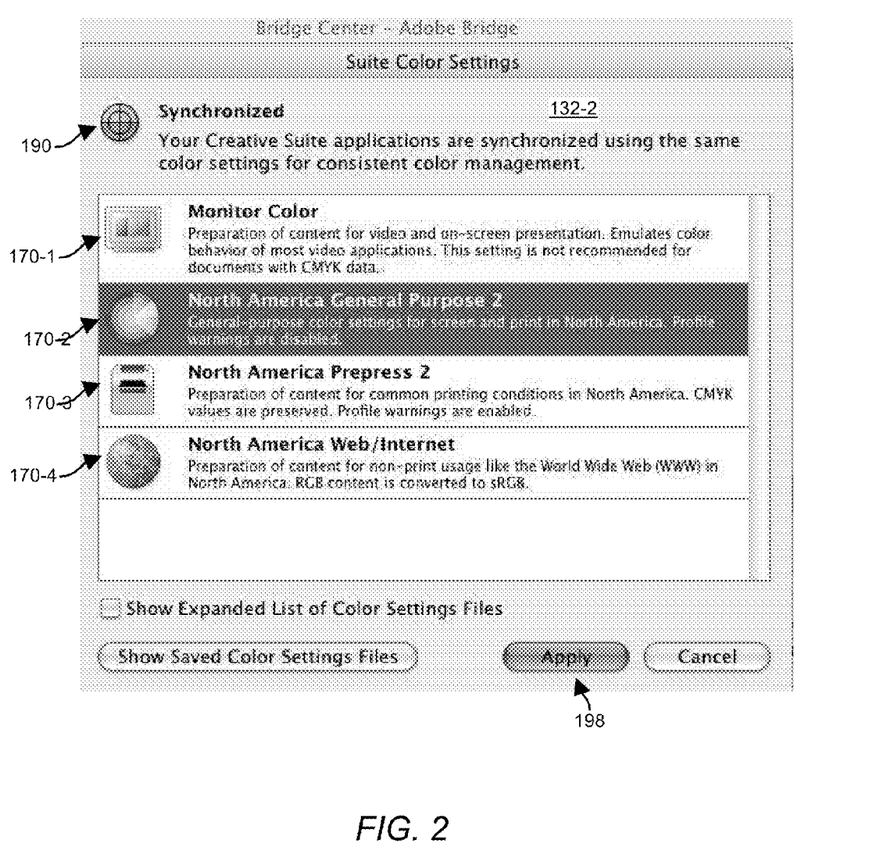
FIG. 2 illustrates a graphical user interface produced by a configuration manager configured to operate in accordance with one example configuration.

FIG. 2 is a graphical user interface 132-2 rendered by the configuration manager 150 that allows a user 108 to adjust, input or otherwise select a global configuration setting 195 that the configuration manager 150 then applies to the plurality of applications 120 to conform their respective local configuration settings 160 to the selected global configuration setting 170. In operation, the user 108 is able to select a particular global color setting 170-1 through 170-M for storage within the global configuration settings file 170. After the user 108 chooses a specific global configuration setting 170 (e.g., a color rendering technique in this illustrated example) and applies the selection 170 via activation of the apply button 198, the configuration manager 150 applies the selected global configuration setting 170 to each of the applications 120 as will be explained.

In this manner, configurations disclosed herein allow input and application of global configuration settings to a plurality of applications from the configuration manager 150. Additionally, both the configuration manager and one or more of the applications 150 are equipped with the processing logic as disclosed herein to display a synchronization indicator 190 that indicates whether or not local configuration settings associated with that application, or with the entire set of related applications, are synchronized with each other. Note that in the illustrated example explained above, the configuration manager 150 provides the functionality of setting a global configuration setting 170. Is to be understood that this is shown by way of example only and that in an alternative configuration, one or more of the individual applications 120 are capable of accessing a graphical user interface 120 such as that shown in FIG. 2 that allows selection of a global configuration setting 170 to apply to all other applications 120. Accordingly, embodiments disclosed herein are not limited to providing selection of global configuration settings from a centralized configuration manager 150.

Further details of processing operations provided by embodiments disclosed herein will now be described with respect to FIGS. 1 through 5 and with flowcharts of processing steps beginning with FIG. 6.

Figure 6:
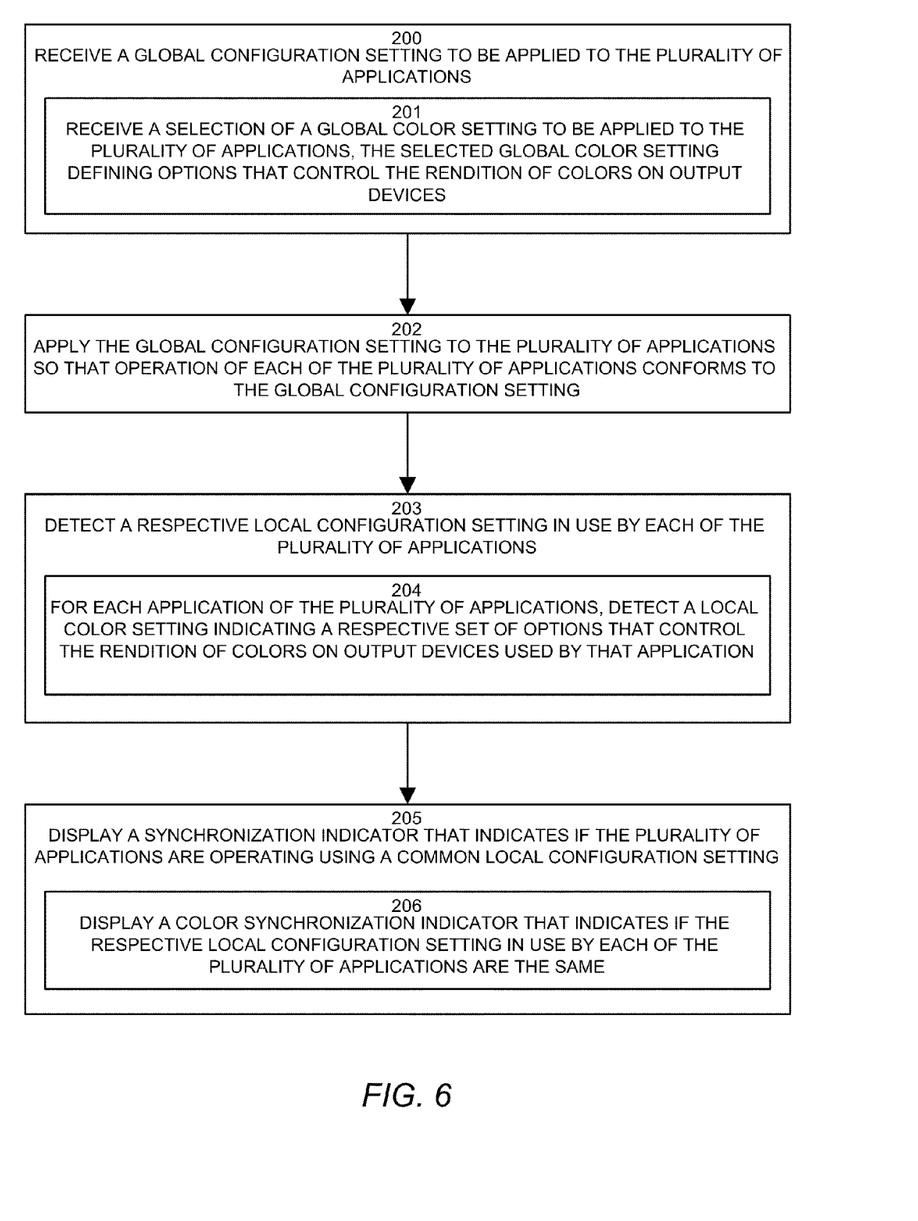

FIG. 6 is a flowchart of processing steps that a configuration manager 150 performs in accordance with embodiments disclosed herein to provide synchronization of configuration settings across a plurality of applications 120. As noted above, it is to be understood that this functionality can be provided in the configuration manager 150 as previously explained, in one or more of the individual applications 120 of the plurality of applications.

In step 200, the configuration manager 150 receives a global configuration setting 170 to be applied to the plurality of applications 120. Sub-step 201 shows details of this processing in accordance with one example configuration.

In step 201, the configuration manager 150 receives a selection of a global color setting to be applied to the plurality of applications. This is shown in FIG. 2 wherein the user 108 selects one of the color management modes to be used as a global color setting 170. The selected global color setting defines a color rendition process that can be used by the plurality of applications to render colors on a display device such as display 130.

In step 202, the configuration manager 150 applies the global configuration setting 170 to the plurality of applications 120 so that operation of each of the plurality of applications 120 conforms to the global configuration setting 170. In this manner, steps 200 through 202 cause synchronization of configuration settings in each application 120. Details of applying and determining local configuration settings associated with an application (on behalf of a specific user, installed instance of that application, or a computer 110) will be discussed later. Briefly however, various embodiments support communication with an application's local configuration file 160 using an application programming interface (API). This can allow an application to query for the global configuration settings periodically or in response to user input, and/or can allow the configuration manager 150 to "push" the global settings to the local configuration files.

Next, in step 203, the configuration manager 150 detects a respective local configuration setting 160 in use by each of the plurality of applications 120. Note that the configuration manager 150 may perform steps 203 through 205 at a time after which a user 108 may have modified a local color setting of an application 120. Sub-step 204 shows details of this processing in accordance with one example configuration.

In step 204, for each application 120 of the plurality of applications, the configuration manager 150 detects a local color setting 160 indicating a respective color rendition process used by that application 120 to render color on a display device associated with that application.

In step 205, the configuration manager 150 displays a synchronization indicator 190 that indicates if the pluralities of applications 120 are operating using a common local configuration setting 160. Some examples of the synchronization indicator 190 were discussed above. Sub-step 206 shows processing in accordance with one example configuration of displaying the synchronization indicator 190 related to color management.

In step 206, the configuration manager 150 displays a color synchronization indicator 190 (FIGS. 1 through 5) that indicates if the respective local color configuration settings 160 in use by each of the plurality of applications 120 are the same. Alternatively, the configuration manager detect that at least one application of the plurality of applications is configured with a local configuration setting 160 that is different from a local configuration setting 160 of other applications in the plurality of applications, or of the global configuration setting 170 and in response, can display the synchronization indicator 190 to indicate that at least one application is configured with a local configuration setting 160 that is different from other applications in the plurality of applications. In this manner, the synchronization indicator 190 lets the user 108 know the current state of configuration of the applications 120.

Further details of displaying a synchronization indicator 190 that indicates if the pluralities of applications 120 are operating using a common local configuration setting 160 will now be provided with respect to the flow chart of process steps in FIG. 7.

FIG. 7 is a flowchart of processing steps that a configuration manager 150 performs in accordance with various embodiments disclosed herein to display a synchronization indicator 190 indicating if configuration settings across applications 120 are synchronized or not. In other words, FIG. 7 shows details of processing in Step 205 from FIG. 6.

In step 210, the configuration manager 150 determines if the respective local configuration settings 160 in use by each of the plurality of applications 120 are equivalent to the global configuration setting 170, and if so, displays the color synchronization indicator 190 to indicate that each of the plurality of applications is operating in accordance with the global configuration setting 170. In this configuration then, synchronization is performed relative to the global configuration setting 170.

An alternative configuration is shown in step 211.

In step 211, the configuration manager 150 detects that at least one application of the plurality of applications is configured with a local configuration setting that is different from a local configuration setting of a majority of other applications in the plurality of applications and in response, displays the color synchronization indicator 190 to indicate that at least one application of the plurality of applications is configured with a local configuration setting 160 that is different from local configuration settings 160 of a majority of other applications in the plurality of applications. In this configuration then, synchronization is performed relative to a majority value of local configuration settings 160 for all of the plurality of applications.

Steps 212 and 213 show an alternate configuration that uses segmented synchronization indicators 190.

In step 212, the configuration manager 150 displays a synchronization indicator 190 that is divided into segments 191 as shown in FIG. 4 (for example). Each segment 191 represents a respective application 120 in the plurality of applications 120-1 through 120-X. In one configuration, the segmented synchronization indicator 190 is circular and includes pie-shaped wedges that each represents a respective application in the plurality of applications 120.

In step 213, for each of the plurality of applications 120 that is configured with a different local configuration setting 160, the configuration manager 150 displays a segment 191 in the synchronization indicator respectively associated with that application in a manner that indicates that the application 120 is configured with a different local configuration setting 160. For the circular configuration, a pie-shaped wedge corresponding to an application is offset from the center of the circular synchronization indicator 190 to indicate that the application corresponding to that pie-shaped wedge has local configurations settings that are not synchronized. This was explained above with respect to FIGS. 4 and 5.

Figure 8:
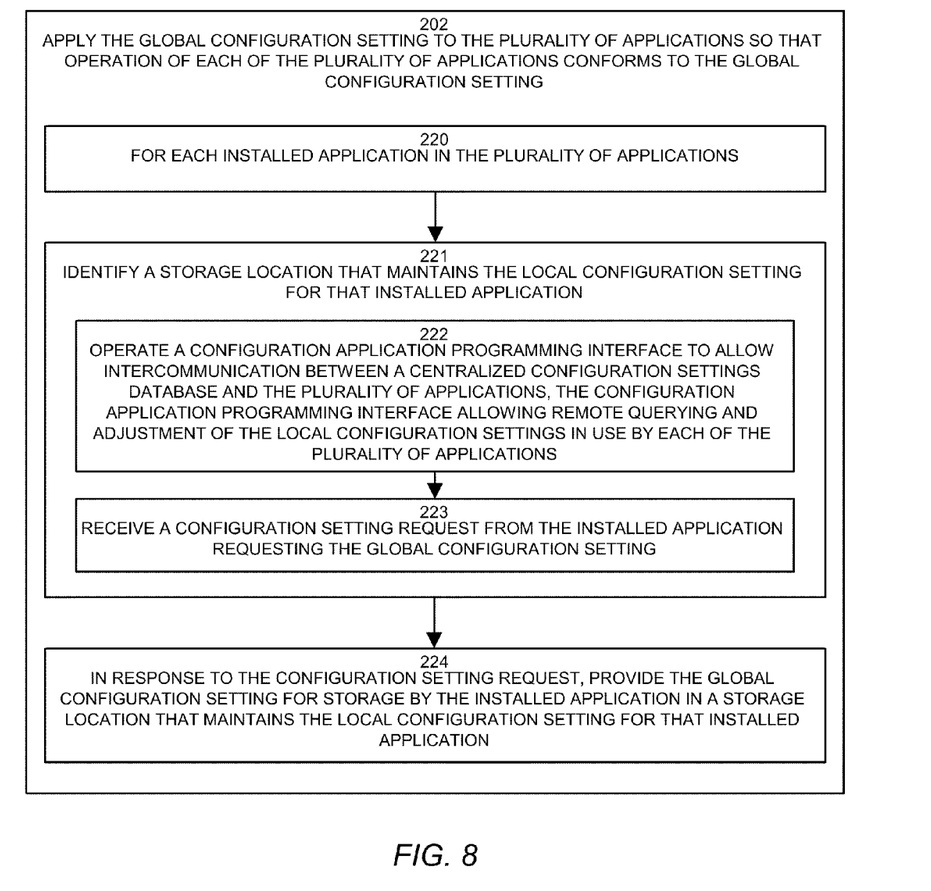

FIG. 8 is a flowchart of processing steps that show details of step 202 (from FIG. 6 above) in which a configuration manager 150 applies the global configuration setting 170 to the plurality of applications 120 so that operation of each of the plurality of applications 120 conforms to the global configuration setting 170.

In step 220, the configuration manager 150 enters a processing loop that occurs for each installed application 120 in the plurality of applications. In an alternative configuration, the configuration manager 150 performs the following operations only for each installed application in the plurality of applications that has a local configuration setting that is different than the global configuration setting. Thus if only a few applications are out-of-sync, the configuration manager 150 can apply the global settings to only those applications 120.

In step 221, the configuration manager 150 identifies a storage location that maintains the local configuration setting 160 for that installed application 120. Sub-steps 222 and 223 show processing to perform this in accordance with one example embodiment.

In step 222, the configuration manager 150 operates a configuration application programming interface (API) to allow intercommunication between a centralized configuration settings database 125 (FIG. 1) and the plurality of applications 120. The configuration application programming interface allows remote querying and adjustment of the local configuration settings 160 in use by each of the installed applications 120.

In step 223, the configuration manager 150 receives a configuration setting request from the installed application 120 requesting the global configuration setting 170. This can take place using a pull protocol over the network 101 or via an inter-process communication (IPC) or remote procedure call (RPC) mechanism within a single computer system.

In step 224, in response to the configuration setting request, the configuration manager 150 provides the global configuration setting 170 for storage by the installed application 120 in a storage location that maintains the local configuration setting 160 for that installed application 120. In this manner, the application overwrites the local setting 160 with the global setting 170.

Note that in an alternative embodiment, a push configuration is used in which the configuration manager 150 proactively (or in response to a user 108 changing the setting of the global configuration via the interface 132-2 in FIG. 2) stores the global configuration setting 160 in the storage location so that the local configuration setting 160 for that installed application is set to a value of the global configuration setting 160. This ensures that the configuration manager 150 has an up-to-date indication of the local settings 160 of the application 120.

Figure 3:
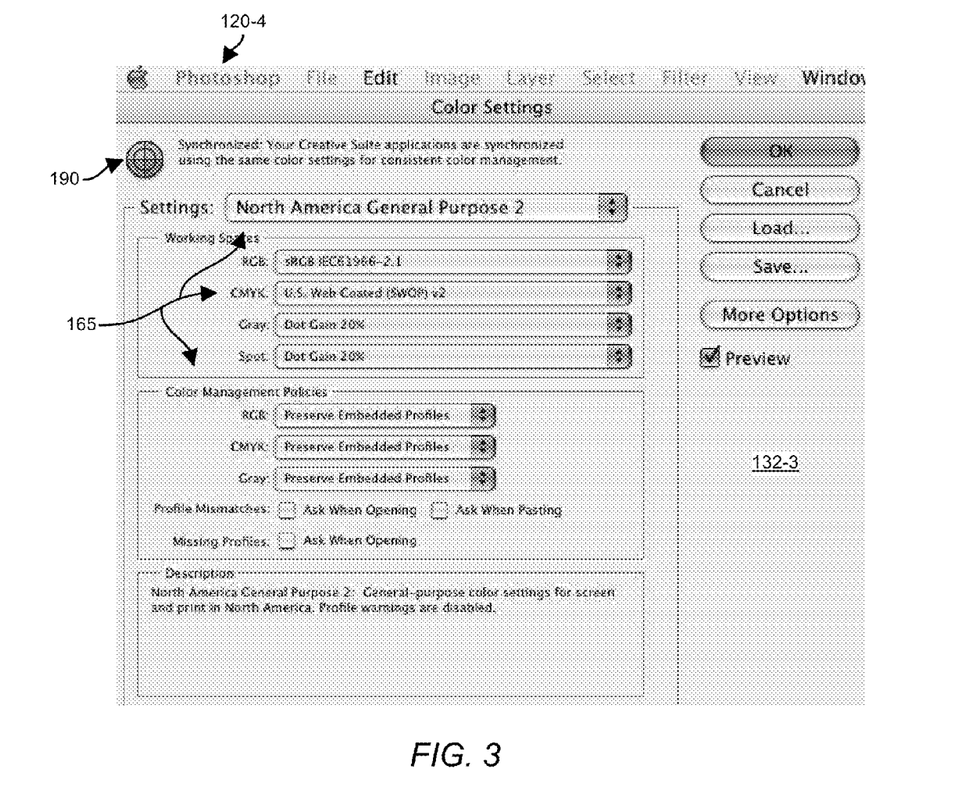
FIG. 3 illustrates a graphical user interface produced by an application having synchronized configuration settings in accordance with one example configuration.

As shown in FIGS. 3 and 4 and as explained above, individual applications 120 themselves can synchronize a local color or other local configuration setting 160 with a global color or other configuration setting defined for the plurality of applications in the global configuration setting file 170. As an example using a color setting as the example configuration setting, each application 120 can operate a configuration application programming interface between the application 120 and a central configuration process 150 to provide a request for a global color setting 170 that defines a color rendition process that can be used by a plurality of applications 120-1 through 120-X to render color on a display device such as display 130. As explained above, the application 120 receives the global color setting 170 from the central configuration process 150 and sets a local color setting 160 to conform to the global color setting 170. In this manner, applications can "pull", either periodically or in response to a user action, the global settings. Additionally as shown in FIGS. 3 and 4, individual applications 120 can be equipped with the synchronization indicator 190. In particular, individual applications 120 can detect a synchronization status of the plurality of applications 120-1 through 120-X, such as by querying the configuration manager 150. The synchronization status 190 indicates if the plurality of applications 120 are operating using a common local color setting 160. From this query and a response from the configuration manager 150, each application 120 can display a synchronization indicator 190 to the user 108 that indicates if the plurality of applications are operating using a common local color setting.

In another alternative embodiment, a user can provide an override configuration setting (in either the configuration manager 150 or when operating an application 120) indicating that a local color setting 160 is to be used in place of the global color setting 170. In response, the application 120 can revert the local color setting 160 to a value defined by a user of the application regardless of the global color setting 170. This allows users to override the global settings 170.

In yet another alternative, when the configuration manager 150 receives a global configuration setting 170 to be applied to the plurality of applications 120, the configuration manager 150 can receive a configuration lock setting indicating that the global configuration setting 170 is to be locked for use by the plurality of applications 120 in place of respective local configuration settings 160 maintained by each of the plurality of applications. This causes the configuration manager 150 to apply the global configuration setting 170 to the plurality of applications 160 so that operation of each of the plurality of applications conforms to the global configuration setting 170 as opposed to the local setting 160, regardless of if a user 108 attempts to modify the configuration settings. In other words, in this alternative, the configuration manager 150 applies the configuration lock setting so that the plurality of applications are unable to revert to using of respective local configuration settings 160 in place of the global configuration setting 170. This avoids users disturbing important configuration settings. In alternative configurations, the synchronization indicator 190 can indicate if settings are locked or not for local or global settings. Thus the local and global lock indicators can be provided in the synchronization indicator 190 to indicate if users are able to change settings (i.e., the global lock) or if the configuration manager 150 is able to change settings (i.e., if a user locally locked their settings to ignore the global settings). Note these alternatives are optional and are preferably used exclusively of each other such that an implementation that uses global locking would not provide users with a local lock, and vice versa.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not intended to be limited by the example configurations provided above.

What is claimed is:

1. A method for synchronization of configuration settings in a plurality of applications, the method comprising:
    receiving a global configuration setting to be applied to the plurality of applications;
    applying the global configuration setting to the plurality of applications so that operation of each of the plurality of applications conforms to the global configuration setting;
    detecting a respective local configuration setting in use by each of the plurality of applications; and
    displaying a synchronization indicator that indicates if the plurality of applications are operating using a common local configuration setting by displaying a color synchronization indicator that indicates if the respective local configuration setting in use by each of the plurality of applications are the same.

2. The method of claim 1 wherein receiving a global configuration setting to be applied to the plurality of applications comprises:
    receiving a selection of a global color setting to be applied to the plurality of applications, the selected global color setting defining options that control the rendition of colors on output devices;
    and wherein detecting a respective local configuration setting in use by each of the plurality of applications comprises:
    for each application of the plurality of applications, detecting a local color setting indicating a respective set of options that control the rendition of colors on output devices used by that application.

3. The method of claim 2 wherein receiving a global configuration setting to be applied to the plurality of applications comprises:
    receiving a configuration lock setting indicating that the global configuration setting is to be locked for use by the plurality of applications in place of respective local configuration settings maintained by each of the plurality of applications; and
    wherein applying the global configuration setting to the plurality of applications so that operation of each of the plurality of applications conforms to the global configuration setting comprises:
    applying the configuration lock setting so that the plurality of applications are unable to revert to use of respective local configuration settings in place of the global configuration setting.

4. The method of claim 3 wherein the global configuration setting and respective local configuration setting specify configuration information to control processing of applications in the plurality of application, such configuration information including at least one of:
    definition of a color rendition options that can be used by the plurality of applications to render color on a display device;
    definition of an output data format that can be used by the plurality of applications to output data files in the output data format;

definition of transparency settings used by the plurality of applications; and definition of a font strategy to be used by the plurality of applications.

5. The method of claim 2 wherein displaying a synchronization indicator that indicates if the plurality of applications are operating using a common local configuration setting comprises:

determining if the respective local configuration setting in use by each of the plurality of applications are equivalent to the global configuration setting, and if so, displaying the color synchronization indicator to indicate that each of the plurality of applications is operating in accordance with the global configuration setting.

6. The method of claim 2 wherein displaying a synchronization indicator that indicates if the plurality of applications are operating using a common local configuration setting comprises:

detecting that at least one application of the plurality of applications is configured with a local configuration setting that is different from a local configuration setting of other applications in the plurality of applications;

displaying the synchronization indicator to indicate that at least one application is configured with a local configuration setting that is different from other applications in the plurality of applications.

7. The method of claim 6 wherein displaying the synchronization to indicate that at least one application is configured with a local configuration setting that is different from a local configuration setting of other applications in the plurality of applications comprises:

displaying a synchronization indicator that is divided into segments, each segment representing a respective application in the plurality of applications;

for each of the plurality of applications that is configured with a different local configuration setting, displaying a segment in the synchronization indicator respectively associated with that application in a manner that indicates that the application is configured with a different local configuration setting.

8. The method of claim 7 wherein detecting that at least one application of the plurality of applications is configured with a local configuration setting that is different from a local configuration setting of other applications in the plurality of applications comprises:

detecting that at least one application of the plurality of applications is configured with a local configuration setting that is different from the global configuration setting.

9. The method of claim 7 wherein detecting that at least one application of the plurality of applications is configured with a local configuration setting that is different from other applications in the plurality of applications comprises:

detecting that at least one application of the plurality of applications is configured with a local configuration setting that is different from a local configuration setting of a majority of other applications in the plurality of applications.

10. The method of claim 6 wherein displaying the synchronization indicator to indicate that at least one application is configured with a local configuration setting that is different from other applications in the plurality of applications comprises:

displaying a circular synchronization indicator that includes a respective pie-shaped wedge for each of the plurality of applications; and for an application that has local configurations settings that are not synchronized, displaying the pie-shaped wedge corresponding to that application offset from the center of the circular synchronization indicator.

11. The method of claim 2 wherein applying the global configuration setting to the plurality of applications so that operation of each of the plurality of applications conforms to the global configuration setting comprises:

for each installed application in the plurality of applications:

i) identifying a storage location that maintains the local configuration setting for that installed application;

ii) storing the global configuration setting in the storage location so that the local configuration setting for that installed application is set to a value of the global configuration setting.

12. The method of claim 11 comprising:

performing operations of identifying a storage location and storing the global configuration setting in the storage location are performed only for each installed application in the plurality of applications that has a local configuration setting that is different that the global configuration setting.

13. The method of claim 2 wherein applying the global configuration setting to the plurality of applications so that operation of each of the plurality of applications conforms to the global configuration setting comprises:

for each installed application in the plurality of applications:

i) receiving a configuration setting request from the installed application requesting the global configuration setting; and ii) in response to the configuration setting request, providing the global configuration setting for storage by the installed application in a storage location that maintains the local configuration setting for that installed application.

14. The method of claim 2 wherein applying the global configuration setting to the plurality of applications and detecting a respective local configuration setting in use by each of the plurality of applications each comprise:

operating a configuration application programming interface to allow intercommunication between a centralized configuration settings database and the plurality of applications, the configuration application programming interface allowing remote querying and adjustment of the local configuration settings in use by each of the plurality of applications.

15. The method of claim 14 comprising:

maintaining a centralized configuration settings database in relation to the plurality of applications on a per user basis, such that multiple instances of a single application being used by different users respectively maintain global and local configuration settings in the centralized configuration settings database.

16. The method of claim 2 wherein the plurality of applications are a related suite of applications that collectively operate on content related to a common content creation and editing project, and wherein receiving a global configuration setting, applying the global configuration setting, detecting a respective local configuration setting and displaying a synchronization indicator are performed by a central configuration process associated with related suite of applications, the central configuration process providing centralized control of configuration settings of each of the plurality of application in the related suite of applications.

17. The method of claim 16 wherein the plurality of applications in the related suite of applications include a web page development application and a digital graphics editing application.

18. The method of claim 2 wherein receiving a selection of a global color setting to be applied to the plurality of applications comprises:
receiving a selection of a color setting from a plurality of color settings, the plurality of color settings including at least two of:
i) a monitor color setting of a computer monitor upon which the synchronization indicator is displayed;
ii) a North America General Purpose color setting;
iii) a North America Prepress color setting; and
iv) a North America Web/Internet color setting.

19. The method of claim 1 wherein receiving the global configuration setting to be applied to the plurality of applications comprises:
receiving a selection of a global color setting to be applied to the plurality of applications, the selected global color setting defining options that control the rendition of colors on output devices;
and wherein detecting the respective local configuration setting in use by each of the plurality of applications comprises:
for each application of the plurality of applications, detecting a local color setting indicating a respective set of options that control the rendition of colors on output devices used by that application;
and wherein displaying the synchronization indicator that indicates if the plurality of applications are operating using a common local configuration setting comprises:
displaying a color synchronization indicator that indicates if the respective local configuration setting in use by each of the plurality of applications are the same;
detecting that at least one application of the plurality of applications is configured with a local configuration setting that is different from a local configuration setting of other applications in the plurality of applications; and
displaying the color synchronization indicator to indicate that at least one application is configured with a local configuration setting that is different from other applications in the plurality of applications.

20. The method of claim 19, wherein applying the global configuration setting to the plurality of applications so that operation of each of the plurality of applications conforms to the global configuration setting comprises:
for each installed application in the plurality of applications:
i) identifying a storage location that maintains the local configuration setting for that installed application;
ii) storing the global configuration setting in the storage location so that the local configuration setting for that installed application is set to a value of the global configuration setting;
iii) receiving a configuration setting request from the installed application requesting the global configuration setting; and
iv) in response to the configuration setting request, providing the global configuration setting for storage by the installed application in a storage location that maintains the local configuration setting for that installed application;
and wherein applying the global configuration setting to the plurality of applications and detecting a respective local configuration setting in use by each of the plurality of applications each comprise:
operating a configuration application programming interface to allow intercommunication between a centralized configuration settings database and the plurality of applications, the configuration application programming interface allowing remote querying and adjustment of the local configuration settings in use by each of the plurality of applications.

21. The method of claim 20, wherein the plurality of applications are a related suite of applications that collectively operate on content related to a common content creation and editing project, and wherein receiving a global configuration setting, applying the global configuration setting, detecting a respective local configuration setting and displaying a synchronization indicator are performed by a central configuration process associated with related suite of applications, the central configuration process providing centralized control of configuration settings of each of the plurality of application in the related suite of applications; and wherein the plurality of applications in the related suite of applications include a web page development application and a digital graphics editing application;
and wherein receiving a selection of a global color setting to be applied to the plurality of applications comprises:
receiving a selection of a color setting from a plurality of color settings, the plurality of color settings including at least two of:
i) a monitor color setting of a computer monitor upon which the synchronization indicator is displayed;
ii) a North America General Purpose color setting;
iii) a North America Prepress color setting; or
iv) a North America Web/Internet color setting.

22. The method of claim 21, wherein displaying the synchronization indicator to indicate that at least one application is configured with a local configuration setting that is different from other applications in the plurality of applications comprises:
displaying a circular synchronization indicator that includes a respective pie-shaped wedge for each of the plurality of applications; and
for an application that has local configurations settings that are not synchronized, displaying the pie-shaped wedge corresponding to that application offset from the center of the circular synchronization indicator.

23. The method of claim 21, wherein displaying the color synchronization to indicate that at least one application is configured with a local configuration setting that is different from a local configuration setting of other applications in the plurality of applications comprises:
displaying a synchronization indicator that is divided into segments, each segment representing a respective application in the plurality of applications;
for each of the plurality of applications that is configured with a different local configuration setting, displaying a segment in the synchronization indicator respectively associated with that application in a manner that indicates that the application is configured with a different local configuration setting;
and wherein detecting that at least one application of the plurality of applications is configured with a local configuration setting that is different from a local configuration setting of other applications in the plurality of applications comprises:

detecting that at least one application of the plurality of applications is configured with a local configuration setting that is different from the global configuration setting; and detecting that at least one application of the plurality of applications is configured with a local configuration setting that is different from a local configuration setting of a majority of other applications in the plurality of applications.

24. In an individual application of a plurality of applications, a method for synchronizing a color setting with a global color setting defined for the plurality of applications, the method comprising:

operating a configuration application programming interface between the application and a central configuration process to provide a request for a global color setting that defines a color rendition process that can be used by a plurality of applications to render color on a display device;

receiving the global color setting from the central configuration process;

setting a local color setting to conform to the global color setting;

detecting a synchronization status of the plurality of applications, the synchronization status indicating if the plurality of applications are operating using a common local color setting; and displaying a synchronization indicator that indicates if the plurality of applications are operating using a common local color setting by displaying a color synchronization indicator that indicates if the respective local configuration setting in use by each of the plurality of applications are the same.

25. The method of claim 24 comprising:

receiving an override configuration setting indicating that a local color setting is to be used in place of the global color setting, and in response, reverting the local color setting to a value defined by a user of the application regardless of the global color setting.

26. A computer system comprising:

a display device;

a memory;

a processor;

an interconnection mechanism coupling the display device, the memory, and the processor;

wherein the memory is encoded with a configuration application that when performed on the processor provides a configuration process that causes the computer system to synchronize configuration settings in a plurality of applications by performing processing operations including:

receiving a global configuration setting to be applied to the plurality of applications;

applying the global configuration setting to the plurality of applications so that operation of each of the plurality of applications conforms to the global configuration setting;

detecting a respective local configuration setting in use by each of the plurality of applications; and displaying, on the display device, a synchronization indicator that indicates if the plurality of applications are operating using a common local configuration setting by displaying a color synchronization indicator that indicates if the respective local configuration setting in use by each of the plurality of applications are the same.

27. The computer system of claim 26 wherein when the computer system performs the operation of receiving a global configuration setting to be applied to the plurality of applications the computer system performs the operation of:

receiving a selection of a global color setting to be applied to the plurality of applications, the selected global color setting defining options that control the rendition of colors on output devices;

and wherein when the computer system performs the operation of detecting a respective local configuration setting in use by each of the plurality of applications, the computer system performs the operation of:

for each application of the plurality of applications, detecting a local color setting indicating a respective set of options that control the rendition of colors on output devices used by that application.

28. The computer system of claim 27 wherein when the computer system performs the operation of displaying a synchronization indicator that indicates if the plurality of applications are operating using a common local configuration setting, the computer system performs the operation of:

displaying, on the display device, a color synchronization indicator that indicates if the respective local configuration setting in use by each of the plurality of applications are the same.

29. The computer system of claim 28 comprising:

a communications interface coupled to a network and to the interconnection mechanism, the communications interface allowing the computer system to communicate with the plurality of applications, at least some of which are operating on at least one remote computer system;

and wherein when the computer system performs the operation of applying the global configuration setting, the computer system performs communications over the communications interface to remotely apply the global configuration setting to the local configuration setting of applications of the plurality of applications that are operating on the at least one remote computer system.

30. A computer program product having a computer-readable storage medium including computer program logic stored thereon that, when performed on a computer system provides a configuration process to synchronize color configuration settings in a plurality of applications by causing the computer system to perform the operations of:

receiving a global configuration setting to be applied to the plurality of applications;

applying the global configuration setting to the plurality of applications so that operation of each of the plurality of applications conforms to the global configuration setting;

detecting a respective local configuration setting in use by each of the plurality of applications; and displaying a synchronization indicator that indicates if the plurality of applications are operating using a common local configuration setting by displaying a color synchronization indicator that indicates if the respective local configuration setting in use by each of the plurality of applications are the same.

31. The computer program product of claim 30 wherein the computer program logic that when performed, causes the computer system to perform the operation of receiving a global configuration setting to be applied to the plurality of applications, comprises computer program logic that causes the computer system to perform the operation of:

receiving a selection of a global color setting to be applied to the plurality of applications, the selected global color setting defining options that control the rendition of colors on output devices;

and wherein the computer program logic that when performed, causes the computer system to perform the operation of detecting a respective local configuration setting in use by each of the plurality of applications, comprises computer program logic that causes the computer system to perform the operation of:

for each application of the plurality of applications, detecting a local color setting indicating a respective set of options that control the rendition of colors on output devices used by that application.

* * * * *